United States Patent [19]

Hollstein et al.

[11] 3,723,436
[45] Mar. 27, 1973

[54] PROCESS FOR AROMATIC LACTAMS

[75] Inventors: Elmer J. Hollstein, Wilmington, Del.; Arthur M. Brownstein, Cherry Hill, N.J.

[73] Assignee: Sun Oil Company, Philadelphia, Pa.

[22] Filed: Feb. 25, 1971

[21] Appl. No.: 119,003

[52] U.S. Cl. ............260/281, 260/501.1, 260/515 P, 260/325
[51] Int. Cl. ..............................................C07d 39/00
[58] Field of Search .260/281, 326.5 PM, 325, 289 R

[56] References Cited

UNITED STATES PATENTS

| | | | |
|---|---|---|---|
| 2,079,325 | 5/1937 | Larchar | 260/343 |
| 2,524,392 | 10/1950 | Leffler | 260/289 R |
| 3,091,568 | 5/1963 | Berb | 260/325 |
| 3,546,227 | 12/1970 | Gmunder | 260/289 X |
| 3,681,384 | 8/1972 | Hollstein | 260/325 |
| 3,317,558 | 5/1967 | Becke et al. | 260/325 |
| 3,558,647 | 1/1971 | Sulkowski | 260/325 |
| 2,351,391 | 6/1944 | Bergstrom | 260/281 |

FOREIGN PATENTS OR APPLICATIONS

| | | | |
|---|---|---|---|
| 1,181,221 | 11/1964 | Germany | 260/325 |

*Primary Examiner*—Donald G. Daus
*Attorney*—George L. Church, Donald R. Johnson, Wilmer E. McCorquodale, Jr. and Paul Lipsitz

[57] ABSTRACT

A process for the preparation of aromatic lactams which comprises hydrogenating an aromatic polycarboxylic acid in the presence of a Raney cobalt catalyst.

4 Claims, No Drawings

PROCESS FOR AROMATIC LACTAMS

This invention relates to an improved process for making aromatic lactams from aromatic polycarboxylic acids. Heretofore, complex methods or difficult to obtain intermediates were required to prepare such lactams; see, for example, U.S. Pat. No. 3,317,558 (Friedrich Becke and Elly Jagla, Issued May 2, 1967) where o-cyanobenzyl chloride is treated with a primary amine to obtain phthalimidine products. In contrast, the process of this invention permits preparation of aromatic lactams by a simple procedure involving hydrogenation of an aqueous solution of the diammonium salt of an aromatic polycarboxylic acid in the presence of a Raney cobalt catalyst. It is surprising that in the process of the invention hydrogenation does not proceed to saturate the aromatic ring, but results in an aromatic lactam product.

As indicated, the lactams prepared by the process of the invention are derived from aromatic polycarboxylic acids and these may be characterized by the formula $Ar—(COOH)_n$ where Ar is an aromatic nucleus such as benzene, naphthalene, anthracene, and the like, and $n$ is an integer of at least 2, preferably 2 to 4. The lactam products obtained by the process have the formula

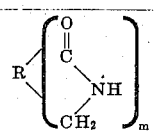

where R is an aromatic ring system such as benzene, naphthalene, anthracene and the like and $m$ is an integer, preferably 1 or 2.

The diammonium salt of the polycarboxylic acid is readily obtained by the addition of 2 moles of ammonium hydroxide to 1 mole of the acid. However, in the process of the invention it is useful to employ additional ammonia in order to ensure an alkaline reaction mass. The amount of excess ammonia is not critical, but need not exceed 20 moles per mole of acid salt.

Raney cobalt is a well-known catalytic material. As used in the process of this invention, the amount of the Raney cobalt is not critical, but generally is used in a catalytically active amount of from about 1 percent to about 10 percent by weight of the polycarboxylic acid used.

In carrying out the reaction, the diammonium salt of the acid is charged to the reactor and aqueous ammonium hydroxide (usually about 28 percent by weight) is added and then the catalyst is added. The reactor is then closed and pressured with hydrogen to a pressure of about 500 to about 1,000 p.s.i.g.

The reaction mass is then heated to a temperature range of from about 150° to about 300°C., about 250°C. being preferred and hydrogen pressure is increased to about 2,000 to 3,500 p.s.i.g. and maintained at that pressure for the entire reaction time which normally runs from about two to about eight, usually about four hours. The product is readily recovered by usual techniques (e.g., crystallization) from its aqueous solution.

EXAMPLE I

Into a 1 liter stainless steel rocking autoclave is charged: 1 mole of the diammonium salt of phthalic acid (previously prepared by addition of 2 moles of ammonium hydroxide to 1 mole of phthalic acid), 200 ml. of 28 percent ammonia hydroxide, and 50 gm. of freshly prepared, wet Raney cobalt. The reactor is closed and further charged with hydrogen to the pressure of 1,200 p.s.i.g. The autoclave is then heated to 250°C. and hydrogen pressure increased to 3,500 p.s.i.g. and held at that pressure for 4 hours. From observations of pressure drop during the reaction it is indicated that about 5 moles of hydrogen were absorbed.

The reaction mass is then cooled, filtered, and the filtrate cooled to permit crystallization of the phthalimidine product. Melting point and analysis by NMR and infrared confirm the product as phthalimidine.

EXAMPLE II

Employing the essential details of Example I, except that the diammonium salt of naphthalene-2,3-dicarboxylic acid is used instead of diammonium phthalate, the reaction product worked up and separated is confirmed by mass spectrographic analysis to be naphthalimidine-2,3.

EXAMPLE III

When Example I is repeated using the diammonium salt of naphthalene-1,8-dicarboxylic acid, the product obtained is confirmed by mass spectrographic analysis to be naphthalimidine-1,8.

The lactam products made by the process of the invention are intermediates to substituted aromatic lactams such as the N-substituted phthalimidines disclosed in U.S. Pat. No. 3,317,558 which are plasticizers and pharmaceutical intermediates. These substituted lactams are readily made from the aromatic lactams made by the process of this invention by conversion of the imide group, e.g.,

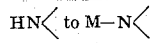

where M is alkali metal and subsequent reaction with an alkyl or aralkyl halide in accordance with known procedures.

The invention claimed is:

1. The process of making aromatic lactams which consists of hydrogenating an aqueous solution of the diammonium salt of an aromatic polycarboxylic acid of the formula $Ar—(COOH)_n$ where Ar is benzene, naphthalene or anthracene and $n$ is an integer of 2 to 4 for a reaction time of from about 2 to about 8 hours, at about 150° to about 300°C, at about 2,000 to about 3,500 psig, and in the presence of a Raney cobalt catalyst.

2. The process of claim 1 where the polycarboxylic acid is phthalic acid and the product is phthalimidine.

3. The process of claim 1 where the polycarboxylic acid is naphthalene-2,3-dicarboxylic acid and the product is naphthalimidine-2,3.

4. The process of claim 1 where the polycarboxylic acid is naphthalene-1,8-dicarboxylic acid and the product is naphthalimidine-1,8.

* * * * *